(12) United States Patent
Ito et al.

(10) Patent No.: US 6,442,293 B1
(45) Date of Patent: Aug. 27, 2002

(54) IMAGE FORMING APPARATUS, IMAGE FORMING METHOD AND COMPUTER-READABLE STORAGE MEDIUM HAVING AN IMAGE FORMING PROGRAM

(75) Inventors: Tadayuki Ito; Hitoshi Otani; Nobuo Kochi, all of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/324,840

(22) Filed: Jun. 3, 1999

(30) Foreign Application Priority Data

Jun. 11, 1998 (JP) .......................... 10-163918
Apr. 7, 1999 (JP) .......................... 11-100669

(51) Int. Cl.[7] .......................... G06K 9/36; G06T 17/00; G06T 15/00

(52) U.S. Cl. .......................... 382/154; 382/285; 382/284; 382/282; 345/424; 345/419

(58) Field of Search .......................... 382/276, 285, 382/295, 206, 154, 282, 284, 286, 287, 153, 151; 345/419, 424, 427; 356/12, 14

(56) References Cited

U.S. PATENT DOCUMENTS

| | | | | |
|---|---|---|---|---|
| 4,823,395 A | * | 4/1989 | Chikauchi | 382/285 |
| 5,446,798 A | * | 8/1995 | Morita et al. | 382/154 |
| 5,986,604 A | * | 11/1999 | Nichols et al. | 342/357.12 |
| 6,144,761 A | * | 11/2000 | Kaneko et al. | 382/154 |
| 6,181,815 B1 | * | 1/2001 | Marugame | 382/154 |

* cited by examiner

Primary Examiner—Leo Boudreau
Assistant Examiner—Yosef Kassa
(74) Attorney, Agent, or Firm—Foley & Lardner

(57) ABSTRACT

An image forming process for easily making an image drawing (ortho-image) in an actual place while confirming it in real time. Measuring of control points (at least three points) is performed (S110), and preparation is made for forming an ortho-image based on image data thereof and survey data. Where photographing is carried out from a plurality of directions, additional image measuring is performed (S140). Then, ortho-image formation is performed on a PC (S160). Here, if a formed ortho-image is not what is desired, ortho-image correction is performed (S180). After a satisfactory image is obtained (S200), the process moves to a next area to be measured, and the same operation is repeated. On the other hand, unless a satisfactory image is obtained, additional image measuring (S140) is performed again.

22 Claims, 11 Drawing Sheets

DISPLAYING OF CONTROL POINT SHORTAGE PLACE/IMPROPER IMAGE PLACE

EXPLANATORY VIEW SHOWING CAMERA COORDINATES AND MODEL COORDINATES

MEASURING OF OFF-LINE CONTROL POINT

EXPLANATORY VIEW SHOWING STEREO PHOTOGRAPHING

IMAGE FORMING APPARATUS, IMAGE FORMING METHOD AND COMPUTER-READABLE STORAGE MEDIUM HAVING AN IMAGE FORMING PROGRAM

BACKGROUND OF THE INVENTION

The present invention relates to an image forming apparatus, an image forming method and a computer-readable storage medium having an image forming program. More particularly, the present invention relates to a portable and simple image measuring technology utilized for surveying and making a drawing in a land surveying field, which uses digital processing by digital photogrammetry and a personal computer.

Specifically, the present invention relates to an image forming technology for forming a digital orthogonally projected image (ortho-image) from one to a plurality of images to be superposed on the drawing when a drawing of a site to be measured is made. The present invention relates to an image forming technology which enables any operator to easily make a drawing of an orthogonally projected image by using a survey instrument and images so as to stick an ortho-image to the drawing, and also enables a digital orthogonally projected image to be generated and rectified such that the situation of a site to be measured can be understood in detail. An object of the present invention is to provide an image which enables stable stereo analysis to be performed even for a stereo-image.

The present invention can also be applied to, for example, an image obtained by photographing a wide range divided into small images having overlapping areas with one another.

According to a prior art, a drawing obtained by surveying in a site to be measured has been made by using paper and a pencil or the like which are typically used in plane table surveying. In recent years, a line drawing of a site to be measured has been made by using a survey instrument and a portable computer in combination which are typically used in pen-based mapping system.

FIG. 18 is a view illustrating conventional stereo-image measuring. Usually, as shown in the drawing, the three-dimensional coordinates are obtained by photographing two or more overlapped images based on the principle of triangulation by stereo-image photographing. If a target range is wide, a plurality of images are photographed. For example, in even a simple site, photographing of ten to twenty images is usually necessary. In this case, unless orientation (i.e., calculating a camera position, inclination or the like) can be performed for each stereo pair (model), a stereo-image cannot be rectified. Three-dimensional measuring cannot be performed, either.

SUMMARY OF THE INVENTION

In the conventional case, however, a drawing was expressed only by a line image even if it was made in the actual place, and it was impossible to sufficiently understand the situation of the site. Thus, the situation of the site was photographed by a camera. However, since photographing was performed from an oblique direction whereas a direction of a requested drawing was vertical, a photographed image had no direct connection with the drawing. As a result, it was necessary for an operator to understand the situation of the site by comparing the drawing with the image. This practice was inconvenient, and understanding of the site was difficult.

A range to be photographed with one image was limited. Even in the case of photographing a plurality of images, because correlation and continuity among the respective photographs are lacking, this led to the difficulty of obtaining consistency among the photographs, and comparison with the drawing was complicated and difficult. If a highly accurate ortho-image was required, lens distortion of the camera was an obstacle. Conventionally, it was impossible to produce a highly accurate ortho-image by a camera which has no data on lens distortion.

In the case of conventional land surveying, for surveying a site to be photographed and making a drawing for the site, it was necessary to survey an enormous number of points and perform three-dimensional measuring. Thus, much man power and labor had to be expended. On the other hand, if a close and terrestrial photogrammetry is used, indirect survey three-dimensional data can be obtained only by photographing. But since only a camera using a film was available conventionally, developing and scanning took time (e.g., two to three days), and several days were also expended for analyzing work. Unless processing up to analysis was carried out after film development, there was no knowing whether photographed image data was analyzable or not, and whether stable, sure and highly reliable analysis was possible or not. As a result, conventionally, this method has not been used so often because the necessity to again perform the work such as photographing may happen.

With popularized and increased use of digital cameras in recent years, digital close and terrestrial photogrammetry can now be performed by a digital camera which is different from a conventional film or analog camera. Use of this technology eliminates labor and time for film development and scanning. Since analysis is performed by a computer, the process from photographing to analyzing can be finished within one to two days.

However, after acquisition of photographic data, it was necessary to bring the photographic data to the place of an analyzing device (computer) for analysis and measuring. Thus, photographing improper for analysis might result in the necessity to again perform the work such as photographing, and stable and sure analysis was not always carried out.

For performing analysis and measuring by images, if control point/orienting point arrangement, a photographic range, photographic overlapping or the like was not proper, stable and highly reliable analysis was impossible. Consequently, unstable results occurred, and even analysis itself was impossible.

The present invention was made with the foregoing points in mind. The object of the present invention is to provide an image forming apparatus for, when a drawing of the situation of a site to be measured is made, easily making a drawing of the site from an orthogonally projected image (ortho-image) so as to facilitate understanding of the situation. The object of the present invention is to quickly and easily generate/rectify an image in the site to be measured without any storage omission or mistakes, to understand the situation of the site on the spot, and to easily make an image drawing (ortho-image) in real time while confirming the same. The object of the present invention is to perform image complementary measuring only by simple photographing and surveying of several points with a survey instrument, to simultaneously obtain an image drawing for facilitating understanding of the situation of the site, to interpolate portions not photographed or hard to make out, and to produce an ortho-image of a high resolution and wide range.

Another object of the present invention is to facilitate understanding of a situation from a plurality of images, even if the situation is hard to grasp, for example, some parts are difficult to see or a far part becomes rough with one image, and produce a highly accurate ortho-image. The object of the present invention is to integrate a plurality of images by repeating simple work and obtain a wide-ranging ortho-image. Further, the object of the present invention is to form a highly accurate and high-quality ortho-image at a high speed by photographing a plurality of images overlapped with adjacent areas.

The still another object of the present invention is to correct lens distortion (camera calibration correction) by simple measuring, and simultaneously form a highly accurate ortho-image even by a camera having no lens distortion data. Further, the object of the present invention is to form a good quality ortho-image of a necessary place with required accuracy by using various survey instruments to rectify the ortho-image while measuring the three-dimensional coordinates.

According to the present invention, the following operations and confirmation can be performed in a site to be photographed:

(1) confirmation of a measuring range (e.g., overlapping);
(2) generation and confirmation of an ortho-image obtained by integrating plurality of images;
(3) confirmation of the entire measuring/photographing range and a range to be drawn.
(4) confirmation of entire arrangement of control points/ orienting points; and
(5) confirmation of orientation, and confirmation of a model formed for stereo method analysis.

In accordance with first solving means of the present invention, there is provided an image forming apparatus, which comprises:

a control point measuring section for measuring a centrally projected image having a plurality of control points, and obtaining the image coordinates for said control points;

a coordinate transformation parameter calculating section for obtaining a transformation parameter for correlating, based on said image coordinates for said control points obtained by said control point measuring section and the three-dimensional coordinates for actually measured control points, said image coordinates with said three-dimensional coordinates;

an orthogonally projected image (ortho-image) forming section for forming an orthogonally projected image from said centrally projected image based on said transformation parameter obtained by said coordinate transformation parameter calculating section; and an ortho-image correcting section for correcting the image coordinates obtained by said ortho-image forming section based on the three-dimensional coordinates for actually measured additional points, and then performing correction of said orthogonally projected image.

In accordance with second solving means of the present invention, there are provided an image forming method, an image forming apparatus and a computer-readable storage medium having an image forming program. In this case, the image forming method comprises:

an image input function, to which a plurality of images including control points or orienting points overlapped with one another are inputted;

a storage function for previously storing ground coordinate values of control points or orienting points;

an orthogonally projected image (ortho-image) forming function for forming an ortho-image from plurality of images inputted by said image input function based on image coordinate values, alternatively photographic coordinate value, and said ground coordinate values of the control points or the orienting points; and a determining function for determining, based on the ortho-image formed by said ortho-image forming function, necessity of re-photographing, and necessity of changing a photographing position, alternatively a control point or an orienting point position.

DETAILED DESCRIPTION OF THE PREFERRED EMBODIMENTS

Now, the preferred embodiments of the present invention will be described with datum to the accompanying drawings.

A. Constitution and Operation of Image Forming Apparatus

Figure 1:
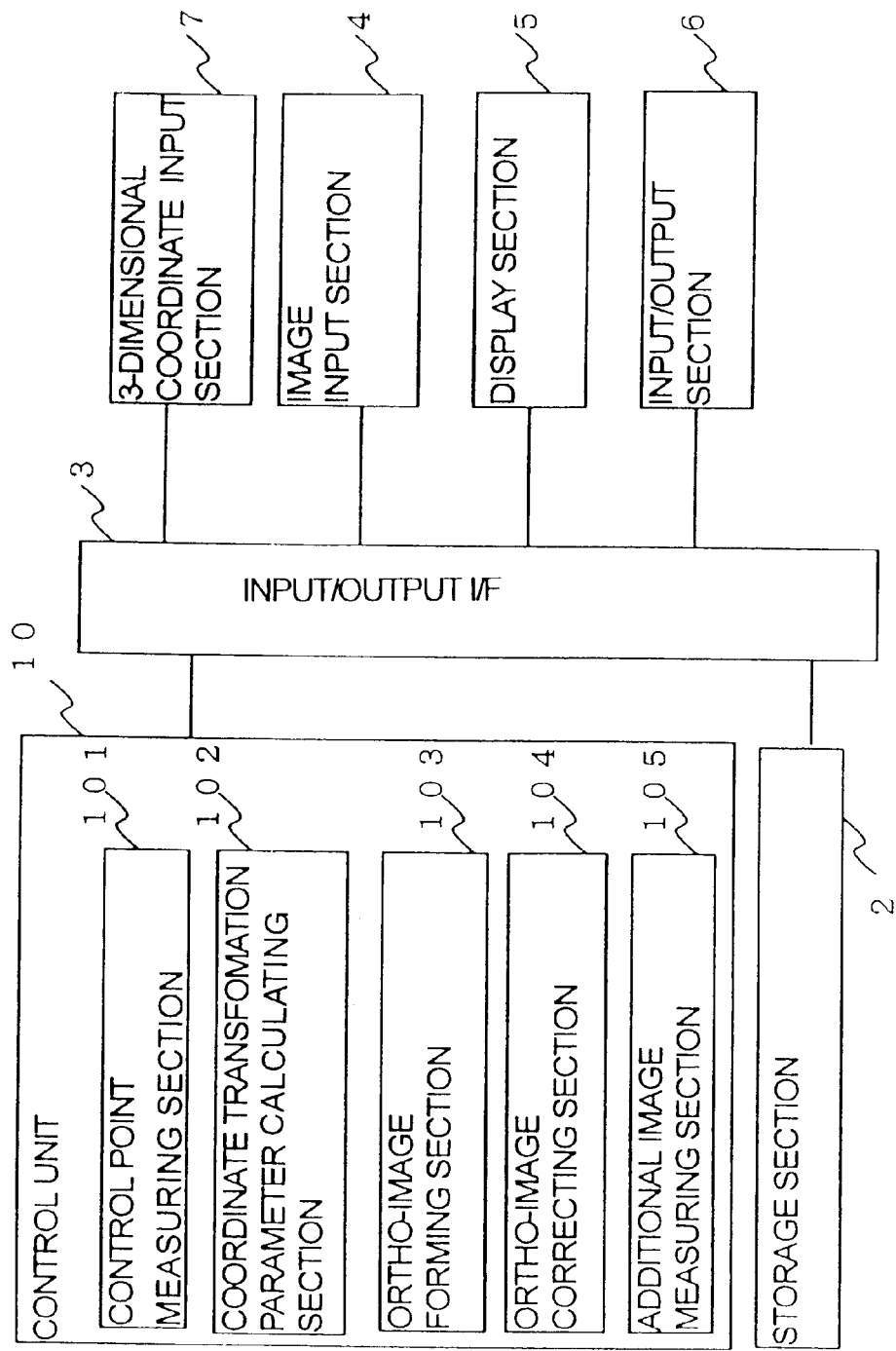
FIG. 1 is a constitutional view of an image forming apparatus of the present invention.

FIG. 1 is a constitutional view of an image forming apparatus of the present invention. The image forming apparatus comprises a control unit 10, a storage section 2, an input/output interface 3, a three-dimensional coordinates input section 7, an image input section 4, a display section 5, and an input/output section 6. The control unit 10 furthermore includes a control point measuring section 101, a coordinate transformation parameter calculating section 102, an ortho-image forming section 103, an ortho-image correcting section 104, and an additional image measuring section 105. These sections (functions) can be realized by, for example, a portable computer (a PC).

The storage section 2 previously stores control point data, and stores image data or the like. The control point data is stored in, for example, the three-dimensional coordinates (X, Y, Z) called ground coordinates. The input/output interface 3 is composed of a common bus or the like, and used for connecting various devices. The three-dimensional coordinates input section 7 obtains the three-dimensional coordinates for control points or additional measuring points by various survey instruments, e.g., a global positioning system (a GPS), a total station, and so on, or a three-dimensional coordinates measuring device. The image input section 4 obtains a two-dimensional or three-dimensional image from, for example, a digital camera. From the image input section 4, one or a plurality of images including control points are inputted.

The display section 5 is provided with a CRT, a liquid crystal display, a plasma display or the like, and performs two-dimensional or three-dimensional displaying. The display section 5 displays an ortho-image formed by the ortho-image forming section 103, the ortho-image correcting section 104 of the control unit 10. The display section 5 also displays a control point position inputted by the control point measuring section 101, an image added by the additional image measuring section 105 or the like. The input/output section 6 transfers various image data and results of determination, alternatively the three-dimensional coordinates data or the like from a three-dimensional coordinates input device such as a survey instrument or the like with other units. For the input/output section 6, various input/output devices, for example, an optical disk device, a card recording medium (e.g., an HDD, a memory or the like), a floppy disk, a keyboard, a pen, a mouse, a terminal and a CD-ROM disk drive, can be provided. The input/output section 6 gives instructions regarding control points and various positions on the screen of the display section 5 by a pointing device such as a mouse, a write pen or the like.

The control point measuring section 101 measures a centrally projected image having a plurality of imprinted control points, and obtains the image coordinates for the control points. The control point measuring section 101 measures, by using, as the three-dimensional coordinate input section 7, a survey instrument for measuring a distance and an angle from an already-known point, the three-dimensional coordinates for the control points based on the obtained coordinates, and stores the same in the storage section 2 as required. Depending on the control points, the control point measuring section 101 can automatically obtain each centrally projected image coordinate value corresponding to each control point for which the three-dimensional coordinates has been obtained.

The coordinate transformation parameter calculating section 102 obtains a transformation parameter. This transformation parameter is used for transforming the image coordinates obtained by the control point measuring section 101 into the photographic coordinates having an original point set as a principal point (a point where a line passing through a lens center and orthogonal to the screen intersects the image), and correlating, based on the image coordinates and the three-dimensional coordinates for the control points, which have been obtained by the control point measuring section 101, the image coordinates with the three-dimensional coordinates. Also, as described later, the coordinate transformation parameter calculating section 102 can calculate, by satisfying a collinear condition for central projection and using an image input section where a principal distance is known, a transformation parameter based on at least three control points, for which a ground coordinate system is known. Further, the coordinate transformation parameter calculating section 102 can correct lens distortion based on lens distortion data of the image input section or actually measured data of a plurality of control points.

The ortho-image forming section (ortho-image forming function) 103 transforms the three-dimensional coordinates into the image coordinates based on the transformation parameter obtained by the coordinate transformation parameter calculating section 102, and forms an orthogonally projected image. For forming an orthogonally projected image by sticking a plurality of images, the ortho-image forming section 103 can select each image obtained based on a distance from each image to a control point or a distance from each image to a measuring point.

Also, the ortho-image forming section 103 forms an ortho-image from image coordinate values (or photographic coordinate values) of the control points/orienting points and ground coordinate values based on a plurality of stereo images inputted by the image input section 4. The ortho-image forming section 103 can include a function of discriminately displaying a non-overlapped area/non-photographed area determined by the ortho-image correcting section 104 or a shortage/failed positioning of the control points/orienting points on the display screen of the ortho-image. Further, the ortho-image forming section 103 can include a function of executing orientation such as successive orientation, relative orientation or the like based on a plurality of stereo images.

The ortho-image correcting section 104 corrects the image coordinates obtained by the ortho-image forming section 103 based on the three-dimensional coordinates for actually measured additional points, and performs correction of the orthogonally projected image. Also, the ortho-image correcting section 104 can form, if a plurality of centrally projected images are obtained, an orthogonally projected image by combining images selected according to a proper standard, e.g., images of places having specified/lower reduction scales or having relatively small reduction scales, alternatively images close to the measuring point or the control point, on priority basis. Further, the ortho-image correcting section 104 can display on the display section 5, if a plurality of centrally projected images are obtained, an image shortage area or an improper area which results from formation of the orthogonally projected image performed by the ortho-image forming section 103.

A determining function included in the ortho-image correcting section 104 determines, based on the ortho-image formed by the ortho-image forming section 103, necessity of changing a photographing position and necessity of changing positions of the control points/orienting points. This determining function includes a function of extracting a non-overlapped area, the area being not overlapped by at least two stereo images in the ortho-image. A determining section 12 includes a function of extracting a non-photographed area which is not covered with by stereo images in a measuring target area. Also, the determining function includes a function of determining a shortage/failed positioning of control points/orienting points included in a portion overlapped by at least two stereo images in the ortho-image. Further, the determining function includes a function of outputting, if results of orientation performed by the ortho-image forming section 11 are not converged, an instruction for changing setting of the control points/orienting points to both or either of the ortho-image forming section 103 and the additional image measuring section 105.

A correction data forming function included in the ortho-image correcting section 104 forms data for re-photographing if the determining function detects a non-overlapped area/non-photographed area or a shortage/failed positioning of the control points/orienting points in the ortho-image. This data for re-photographing is necessary for solving the detected failure, and for this data, for example, data regarding a photographing position, data regarding a photographing range, data regarding selection of control points/orienting points, data for specifying control points/orienting points to be rearranged or the like can be used. Such data is fed back to the ortho-image forming section 103.

The additional image measuring section 105 measures other centrally projected images so as to include the control points measured by the control point measuring section 101, and calculates transformation parameters for these centrally projected images by using the coordinate transformation parameter calculating section 102.

Next, an overall operation will be summarized.

Figure 2:
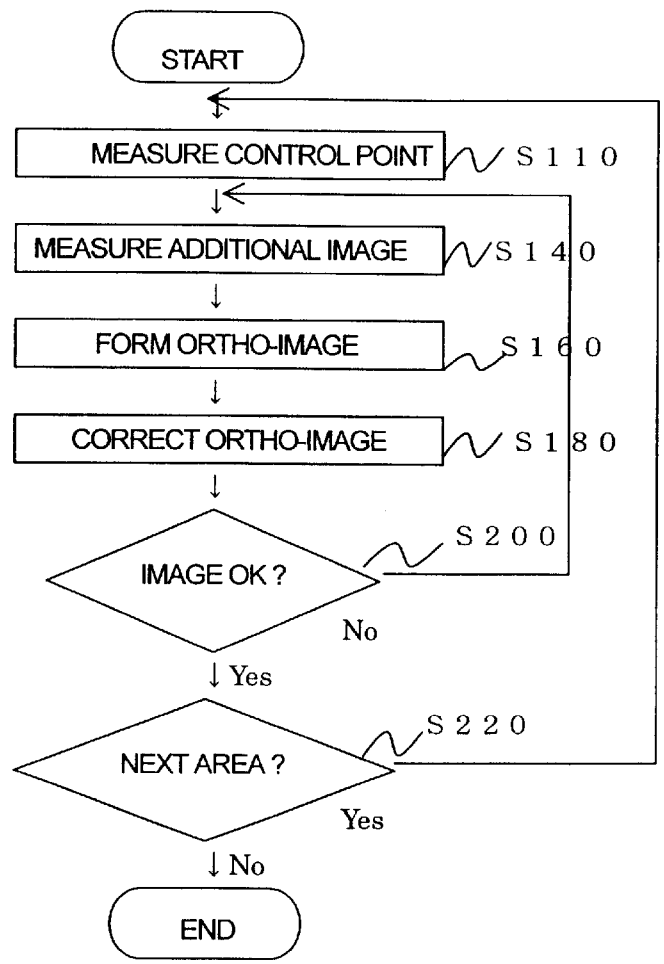
FIG. 2 is a flow chart of an image forming process according to a first embodiment of the present invention.

FIG. 2 is a flow chart of an image forming process according to a first embodiment of the present invention. The drawing shows a case where an image is formed based on one or more images and three-dimensional coordinate values by a survey instrument. An image forming process carried out in the control unit 10 is described hereinbelow by referring to FIG. 2.

The process shown in FIG. 2 has two courses of processing-on-line processing performed in an actual place, and off-line processing for performing only control point measuring in the actual place and bringing back remaining jobs to be finished in an office or the like. In the on-line processing, different from the case of the off-line processing, control point measuring, subsequent image forming, displaying, and so on, are carried out in the actual place.

In the image forming process, first measuring of control points (three points or more) is performed (step S110), and preparation is made for forming an ortho-image based on image data thereof and survey data. Furthermore, if photographing is carried out from a plurality of directions, additional image measuring is performed (step S140). For performing analysis only with one image, the additional image measuring (step S140) is unnecessary. Then, for example, on a PC, ortho-image formation is performed (step S160). Here, if a formed ortho-image is not what is desired, ortho-image correction is performed (step S180). In this ortho-image correction work, determination is made as to whether a satisfactory image is obtained or not (step S200). If "OK", then the process moves to a next area to be measured, and the same operation is repeated from the control point measuring (step S110). On the other hand, if no satisfactory image is obtained in the ortho-image correction work (step S180), then the additional image measuring (step S140) is carried out again, and the foregoing operations are repeated until a satisfactory image is obtained.

The additional image measuring (step S140) is performed, for example if some parts are hard to see when photographing is carried out from one direction, if an image of a far part becomes rough even on one image and thus sufficient accuracy is not provided, or the like. In other words, if an ortho-image is formed by performing further photographing from another direction for compensating for an already inputted image or yet another direction where there is a shortage, a place hard to see or a place of less accuracy will be selected/synthesized from a camera image of another direction, and thereby a good quality ortho-image will be formed.

Figure 3:
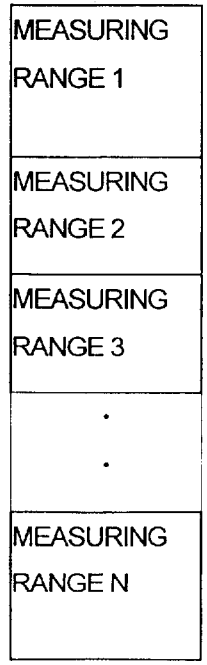
FIG. 3 is an explanatory view showing a case where a wide range is measured.

FIG. 3 is a view illustrating a case where a wide range is measured. If a range to be measured is wide, a measuring range may be decided in accordance with necessary accuracy, and the image forming process in FIG. 2 may be repeated sequentially in respective areas of measuring ranges 1, 2, 3, . . . and so on, of FIG. 3. Necessary accuracy depends on, for example, a distance from an object, a size of one CCD pixel or the like. Thus, by dividing a wide range for processing, an ortho-image can be easily formed no matter how wide a range is.

Figure 4:
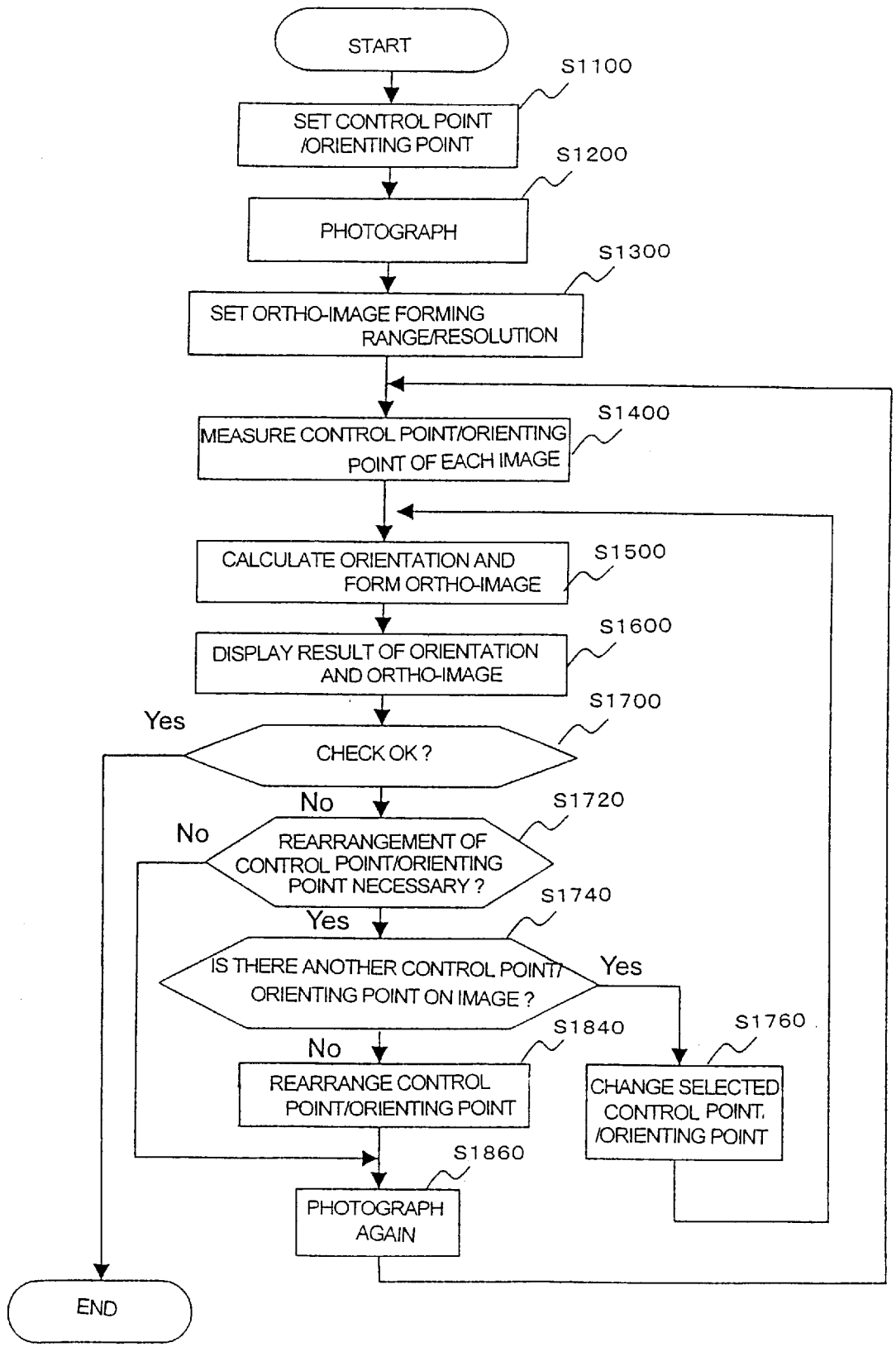
FIG. 4 is a flow chart of an image forming process according to a second embodiment of the present invention.

FIG. 4 is a flow chart of an image forming process according to a second embodiment of the present invention. The process shown is image measuring processing for performing stable measuring by stereo images. Image measuring processing is described hereinbelow by referring to FIG. 4.

First, control points/orienting points are set, and measured data is set by a survey instrument (step S1100). The control points have been accurately measured on the basis of a ground coordinate system (absolute coordinate system) (X, Y, Z) beforehand by the survey instrument. If the orienting points are arranged uniformly (discretely) on a photographic image, it is not necessary to measure positions thereof beforehand. Needless to say, the orienting points can be also used as position-measured control points. The ground coordinate system (X, Y, Z) is a three-dimensional orthogonal coordinate system where real space of a model has been set.

Then, photographing is performed such that each image can sufficiently overlap another, and the control points/orienting points, for example at least six points or more, can overlap one another (step S1200). Here, as an example, each image has at least six or more control points/orienting points, however, the proper number thereof can be used as occasion demands. For example, if bundle adjustment or the like is used, the number of control points for measuring can be reduced to three. Even if orienting points are used instead of control points, the necessary number of targets is about six. Alternatively, four points are enough if orienting points can be assumed that they are arranged on a plane.

After the photographing, various set values necessary for image processing, e.g., both or either of an ortho-image forming range and resolution, and so on, are set onto the portable computer (a PC) (step S1300). Then, the control points/orienting points of each image are measured on a PC (step S1400). Here, by the ortho-image forming function, orientation and ortho-image formation are automatically carried out according to a program (step S1500). The specific processing will be described in detail later.

After the calculation by the ortho-image forming function, the results of orientation and an ortho-image are displayed on the display screen (step S1600). Then, based on the results of step S1600, each check item is confirmed for the measured image (step S1700).

The display function displays arrangement of all and each image by the ortho-image. Furthermore, the insufficient results of orientation are discriminately displayed based on various bits of display information by which the check items are confirmed. Regarding the check items, if the results of orientation are insufficient (e.g., targetted accuracy is not achieved, no convergence occurs or the like), improper selection or arrangement of the control points/orienting points is determined. A failure of an entire measuring range such as existence of a non-photographed area caused by omission of photographing or the like is confirmed by the formed ortho-image. If a non-overlapped area exists because of an image overlapping failure, propriety of an overlapped portion is confirmed. If there is such an overlapping failure, by extracting only an overlapped part between adjacent images in the formed ortho-image and displaying the same, a gap is formed in a joined part between images on the ortho-image, and thus immediate determination can be made.

In addition to the confirmation of the display screen by a measuring operator, the check items can be automatically confirmed by the control function (especially, the determining function). If the results of orientation do not converge as in the case of failed arrangement or failed positioning of the control points, or if successive orientation is not normally carried out, the results of orientation containing errors are outputted in the step S1600 is outputted, and a failure such as an improper image is discriminately displayed. For example, the control function can allow the display function to automatically display the fact that the results of orientation fail to achieve the targetted accuracy or fail to converge by an identifier, a flag, and can also allow the display function to discriminately display a proper range by color or patterns. Even in the case where a non-photographed area or a non-overlapped area exists, the area can be properly recognized by the control function and using an image processing technology. Specifically, for example, a vacant place of an image is detected, and by identifying an area/position thereof, the above failures can be determined.

If necessity of correction is decided based on the results of checking, then a decision is made as to necessity of determining, because of a shortage, a positioning failure of the control points/orienting points, arrangement thereof again for re-photographing (step S1720).

Here, for example, if rearrangement of the control points/orienting points is not necessary because only an image photographing position is not proper, as in the case where a non-photographed area or a non-overlapped area exists, data for re-photographing is formed by the correction data forming function, and photographing is performed again according to this data (step S1860). Then, the process is resumed again from the step S1400.

On the other hand, for example, if the arrangement of the control points/orienting points must be changed as in the case where the results of orientation are not converged or successive orientation is not carried out normally, rearrangement thereof is examined (step S1740). If there are other control points/orienting points on the image and the image coordinates for these points is obtained without re-photographing, selection of the control points/orienting points is changed from the already photographed image (step S1760), and the above calculation is started from the step S1500. This processing may be performed automatically. On the other hand, if other proper control points/orienting points do not exist on the image, arrangement changing is performed by moving the arrangement of the control points/orienting points (step S1840). Then, data for re-photographing the image including the rearranged control points/orienting points is formed by the correction data forming function, and re-photographing is performed according to the formed data (step S1860). Then, the process is executed from the step S1400.

The re-photographing processing in the step S1860, the measuring processing in the step S1400 may be executed only for the image including the control points/orienting points, which is necessary to handle each failure, alternatively for all the images to be photographed.

The decision as to necessity of re-photographing based on the results of checking, and the decision as to the step to which the process returns when re-photographing is necessary, may be manually made by the operator based on the display screen, alternatively made automatically by a PC, otherwise made by proper combination of the manual operation and a PC.

As described above, when it is decided that any correction is necessary correction is determined based on the result of checking in the step S1700, the process is finished with the decision that a desired ortho-image has been obtained.

B. Detail of the Processing

Next, the flow chart of FIG. 2 will be described in detail.
(1) Control Point Measuring Processing by the Control Point Measuring Section 101 (step S110).

Hereinbelow, control point measuring processing (step S110) by the control point measuring section 101 is described in detail.

(1-1) On-line Measuring

Figure 5:
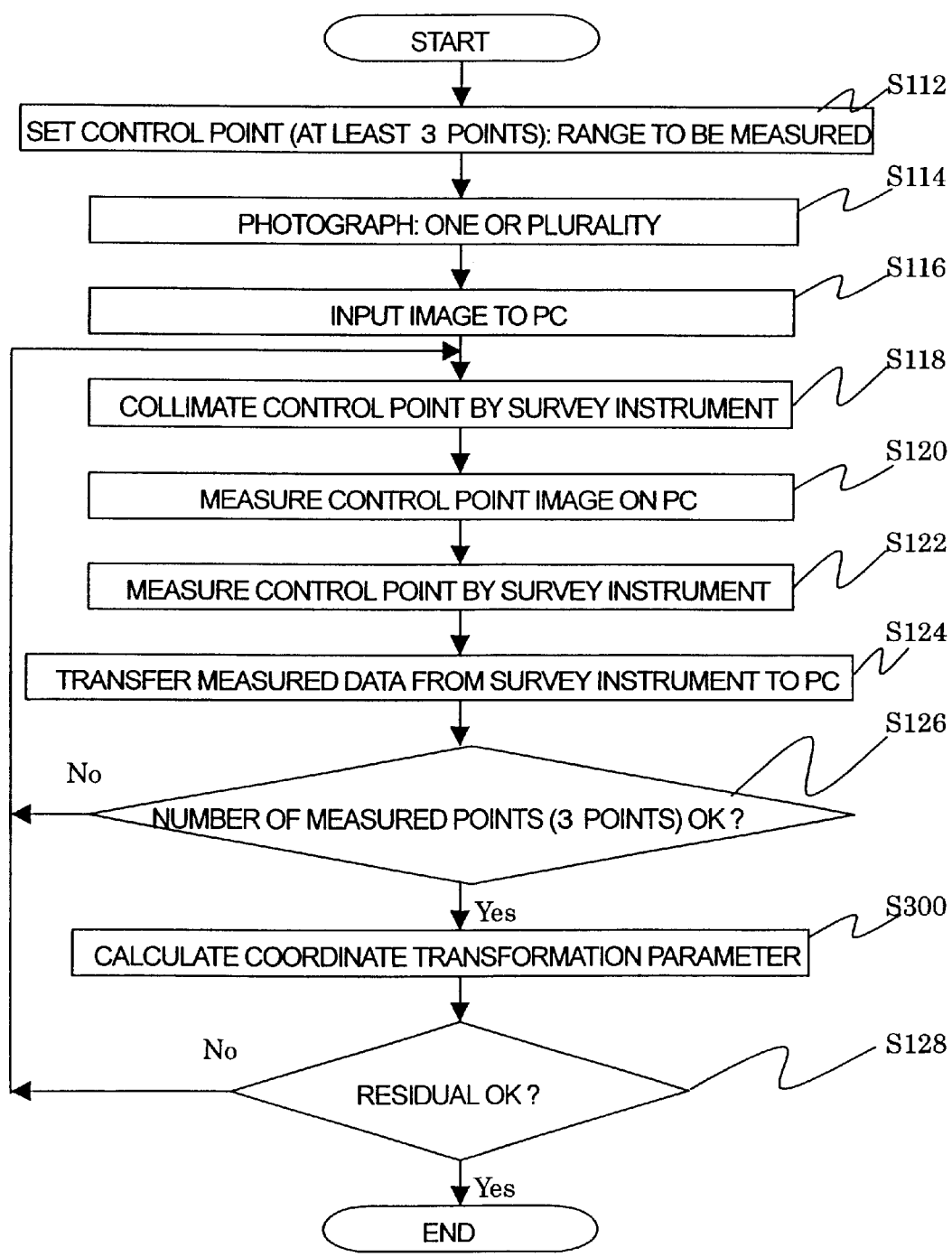
FIG. 5 is a flow chart of on-line control point measuring.

First, an example of on-line measuring will be described. FIG. 5 is a flow chart of on-line control point measuring. In on-line control point measuring for forming an ortho-image on the field of a work site, work is done while forming and confirming an ortho-image in an actual place. Thus, according to the on-line control point measuring, non-efficient work such as re-measuring the control points in the actual place can be avoided, such work being necessary in the case of measuring mistakes or shortage parts found after a photographed image is brought back and analyzed.

First, control points, three points at the minimum, are set in a range to be measured (step S112). Furthermore, the control points are preferably be discriminable targets on an image and measured by a survey instrument (three-dimensional coordinate input section 7). For the control points, for example, prisms or reflecting targets can be used, alternatively those tartgets which return for returning reflecting (measuring) signals can be used in the case of a non-prism total station. Then, photographing is performed by a digital camera (image input section 4) (step S114). This photographing may be performed for one image, or the desired number of images from a plurality of directions. For example, when some parts are hard to see if photographed from one direction, when image accuracy is considered, it is better to perform further photographing from a plurality of directions.

Then, the image photographed by the digital camera and stored in the storage device of the camera is transferred to the control unit 10 of the image forming apparatus and inputted to the storage section 2 (step S116). The image inputted to the control unit 10 comes to be measured on a PC, and the photographed image is displayed on the display section 5. Here, the targets are collimated by the survey instrument (step S118) and confirmed. If OK, the control points as targets are measured on the image on a PC (step S120). In this case, for example, positions of the control points are instructed by a pen as the input device of the input/output section 6. After the image coordinates (px, py) (CCD coordinate system, and an original point is set to be a screen end such as the left upper end of the screen) is measured, a measuring instruction is outputted to the three-dimensional coordinates input section 7, measuring is performed by the three-dimensional coordinates input section 7 (step S122), and then measured ground coordinate values of the control points are sent through the input/output I/F 3 to the control unit 10 and the storage section 2 (step S124). Accordingly, correlation of the ground coordinates for the control points with the image coordinates on a PC and measuring are completed. Then, the same work is repeated for the minimum three points (step S126).

Next, automatic control point measuring by the control point measuring section 101 will be described.

Figure 6:
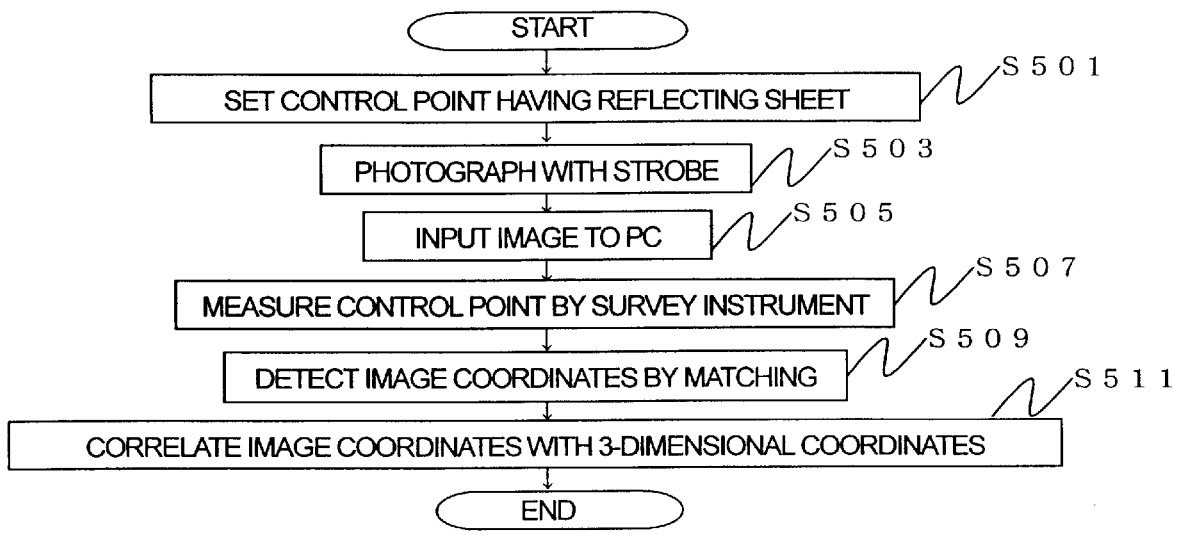
FIG. 6 is a flow chart of automatic control point measuring performed by a control point measuring section.
Figure 7:
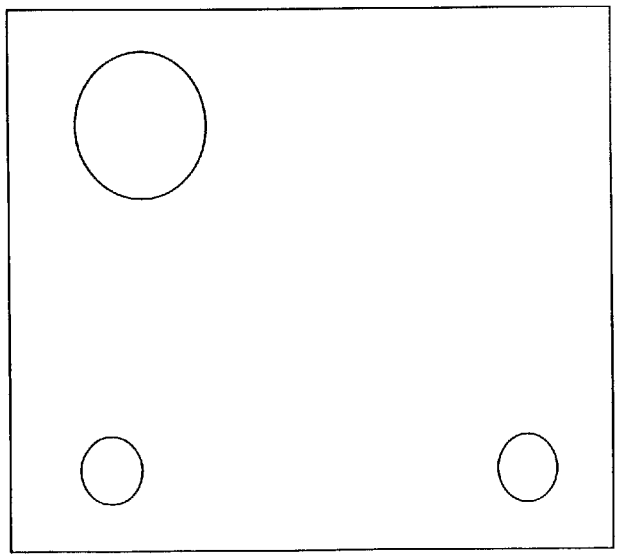
FIG. 7 is an explanatory view showing an example of control point arrangement.

FIG. 6 is a flow chart of automatic control point measuring performed by the control point measuring section. FIG. 7 is a view showing an example of arrangement of control points.

First, control points having reflecting sheets are set (step S501). Attaching the reflecting sheets facilitates automatic measuring with an image and simultaneous measuring work by a total station, a non-prism total station. The control points are set as targets to be seen from any directions, and these points can be fixed to, for example, apexes of triangle pyramids or triangle poles. If the number of control points is three, for example, arrangement like that shown in the drawing is set, and it is advisable to set one obviously different in size. Then, as one example, photographing is carried out with a strobe light (step S503). Accordingly, any situations can be surely detected. Then, the photographed image is inputted to the personal computer (step S505). Then, the three-dimensional coordinates are measured by the survey instrument (step S507). For measuring the control point having the largest reflecting sheet, information thereof is transferred as an attribute is simultaneously transferred from the survey instrument to the control unit 10.

Then, by template matching (image correlation processing), the image coordinates on the image is detected (step S509). For example, a light quantity returns from each of the reflecting sheets has high luminance, and by registering the shapes of the control points as templates (matching patterns) beforehand, position detection is facilitated. For the templates, in this example, two kinds of small and large templates can be prepared. Then, the image coordinates for the position-detected control points are correlated with points of the three-dimensional coordinates (step S511). For example, by arranging three points and setting one among them to be large as shown in the drawing, the large control point on the image becomes discriminable by the template, and is correlated based on the attribute measured on the three-dimensional coordinates. The other two points can be correlated based on the three-dimensional coordinates positions and the image coordinates positions thereof even if these points are photographed from any directions.

For increasing reliability of position detection, two images are photographed, one with a strobe light and the other without a strobe light, and by taking a difference between these two images, only the targets emerge. Thus, automatic coordinate position detection by matching becomes surer and more reliable. Accordingly, detection can be surely carried out from any directions.

The processing has been described with datum to the large and small reflecting sheets. Image coordinates detection and correlating can also be performed by coloring or patterning the reflecting sheets. Other than the reflecting sheets, any discriminal materials on the image can be used. Accordingly, there are no limitations placed on the number, arrangement, shapes, and so on of control point.

Next, template matching processing will be described.

For template matching, any proper method such as a normalized cross correlation method, a sequential similarity detection algorithm (SSDA) or the like may be used. For example, by using the SSDA, a processing speed can be increased. Hereinbelow, the SSDA is described.

An expression of the SSDA is shown below. In this expression, a point where a residual R(a,b) becomes smallest is an image position to be obtained. For increasing a processing speed, for example, in addition of this expression, the addition is finished when a value of R(a,b) exceeds a minimum value of a past residual, and calculation is performed so as to move to next (a,b).

$$R(a, b) = \sum_{m1=0}^{N1-1} \sum_{n1=0}^{N1-1} |I_{(a,b)}(m_1, n_1) - T(m_1, n_1)| \quad (1)$$

$T(m_1, n_1)$: Template image,
$I_{(a,b)}(m_1, n_1)$: Partial image of target image
(a,b): Left upper coordinates of template image
R(a,b): Residual (1-2) Coordinate Transformation Parameter Calculation Processing by the Coordinate Transformation Parameter Calculating Section 102 (step S300)

If the foregoing measuring for the control points is OK, then coordinate transformation parameter calculation by the coordinate transformation parameter calculating section 102 is performed (step S300).

Figure 8:
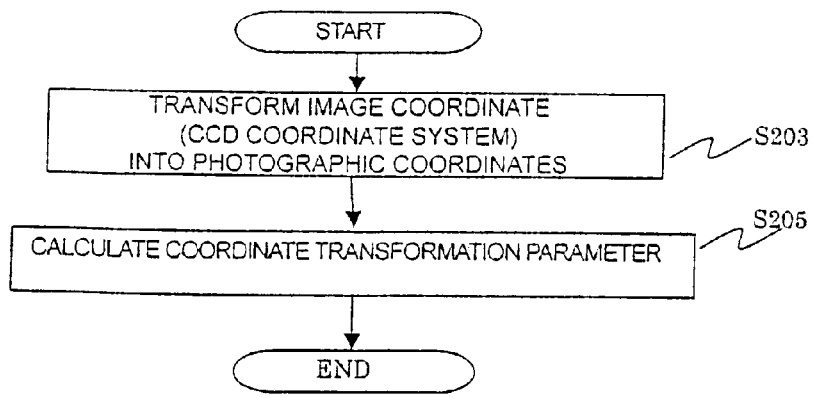
FIG. 8 is a flow chart of coordinate transformation parameter calculation process.

FIG. 8 is a flow chart of coordinate transformation parameter calculation process.

First, since the points measured on a PC are obtained as the image coordinates on a charge coupled device (a CCD) such as a digital camera, these coordinates are transformed into a photographic coordinate system (x, y) (step S203). The photographic coordinate system (x, y) is the two-dimensional coordinates having an original point set as a principal point. On the other hand, the image coordinates are CCD coordinate system (px, py), for example, the two-dimensional coordinates having an original point set in the left upper side.

The three points measured on the ground coordinate system (X, Y, Z) by measuring of the survey instrument and the two points of the image coordinate system (x, y) measured on a PC are substituted for expressions below, and each parameter for coordinate transformation (coordinate transformation parameter) is obtained (step S205). Expressions 2 and 3 are collinear condition expressions where a projection center, an image on a CCD and an object are located on a straight line. Accordingly, if there are at least three already-known points, each coordinate transformation parameter can be calculated. In this case, however, a principal distance c must be nearly known. If a calibrated camera is used, no problem occurs since a principal distance c is known.

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} \quad (2)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} \quad (3)$$

Herein,
x, y: Image coordinates,
$x_0, y_0$: Principal point position,
X, Y, Z: Ground coordinates,
$X_0, Y_0, Z_0$: Coordinates of projection center,
c: Principal distance
$a_{ij}$: Rotation matrix
ω,φ,κ: Inclination of camera On the other hand, if a principal distance c is not known, this value can be obtained by measuring coordinate values of four points on a plane based on a two-dimensional projective transformation. Also, by using six points, a relationship between the image coordinates and the three-dimensional coordinates (target points coordinates) of the object can be obtained by an approximate solution based on a three-dimensional projective transformation expression (direct linear transformation).

Hereinbelow, a method by the three-dimensional transformation expression is described. This processing is for calculating a transformation parameter for obtaining a pixel position on an ortho-image. Here, the processing is performed mainly based on known coordinates for the control points/orienting points and the measured image (photographic) coordinates.

First, a basic expression is shown below.

$$x = \frac{L_1 X + L_2 Y + L_3 Z + L_4}{L_9 X + L_{10} Y + L_{11} Z + 1} \tag{4}$$

$$y = \frac{L_5 X + L_6 Y + L_7 Z + L_8}{L_9 X + L_{10} Y + L_{11} Z + 1}$$

Herein,
(x, y): Image coordinates,
(X, Y, Z): Ground coordinates,
$L_1$ to $L_{11}$: Coordinates transformation parameters By calculating the expression 4 by using a least squares method based on data of the control points, coordinate transformation parameters $L_1$ to $L_{11}$ for deciding a relationship between the image coordinates (x, y) and the ground coordinates (X, Y, Z) can be obtained.

Further, a coordinate transformation expression is not limited to the foregoing, and any proper coordinate transformation expressions can be employed as long as these can correlate the ground coordinates with the image coordinates.

(1-3) Camera Calibration

The foregoing description has been made of the case where measuring is performed with accuracy for permitting lens distortion to be ignored or a non-distortion lens is used. However, if there is lens distortion and this distortion cannot be ignored for accuracy, measuring is carried out with a camera having pre-calculated lens distortion or while correcting lens distortion by processing described below.

Specifically, in the case of using a camera having no lens distortion data, the lens distortion is corrected by measuring six or more control points and obtaining lens distortion of the camera based on the following expressions 5 to 7. In the case of a camera having pre-calculated lens distortion, coordinate values are obtained while correcting the lens distortion by using these expressions from the start.

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \tag{5}$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \tag{6}$$

$$\Delta x = x_0 + x(k_1 r^2 + k_2 r^4)$$

$$\Delta y = y_0 + y(k_1 r^2 + k_2 r^4)$$

$$r^2 = (x^2 + y^2)/c^2 \tag{7}$$

$k_1, k_2$: parameters of radical distortion

These expressions are calculated by measuring six or more control points on the ground coordinates and the image coordinates and by a successive approximation solution.

In addition to the foregoing, by using a direct linear transformation with self-calibration, correction of lens distortion can be performed by expressions 8 and 9. In this case, however, at least eight control points are necessary.

$$x + \Delta x = \frac{L_1 X + L_2 Y + L_3 Z + L_4}{L_9 X + L_{10} Y + L_{11} Z + 1} \tag{8}$$

$$y + \Delta y = \frac{L_5 X + L_6 Y + L_7 Z + L_8}{L_9 X + L_{10} Y + L_{11} Z + 1} \tag{9}$$

By canceling denominators of the above expressions based on data of the control points and by using the least squares method, unknown variables $k_1$, $k_2$, $x_0$ and $y_0$ can be obtained.

As described above, lens distortion is obtained by the foregoing expressions, and accordingly, measuring while correcting lens distortion can be performed. These expressions are only examples, and calculation may be carried out by other expressions.

Then, referring again to FIG. 5, after the foregoing coordinate transformation parameters calculation processing (step S300) is finished, by using the transformation parameters, a residual between the coordinate transformation values and the control points is obtained, and a decision is made as to whether the residual is within a prescribed value or not (step S128). If the residual is within the prescribed value, then the process moves to the next processing. On the other hand, if the residual is not within the prescribed value, the process returns to the step S118, and while increasing the number of points to be measured, the operations of the steps S118 to S128 are performed until the residual comes within the prescribed value.

Here, the residual can be obtained in the following manner. Specifically, the transformation parameters obtained by the expressions 2 and 3 (alternatively, the expressions 5 and 6) and the image coordinates (x, y) measured for the control points are substituted in expressions 10 and 11 described below, and calculation control points X' and Y' of the ground coordinate system (X, Y, Z) are calculated. Then, a residual with the actually measured ground coordinate values (X, Y) are obtained by an expression 12. If the residual δ thus obtained is within the prescribed value, it is OK For the prescribed value, for example, accuracy necessary in an actual place is set. Herein, n means the number of control points. Expressions for the residual should not be limited to the ones described here, but any other expressions can be used.

$$X' = (Z - Z_0) \frac{a_{11} x + a_{21} y - a_{31} c}{a_{13} x + a_{23} y - a_{33} c} + X_0 \tag{10}$$

$$Y' = (Z - Z_0) \frac{a_{12} x + a_{22} y - a_{32} c}{a_{13} x + a_{23} y - a_{33} c} + Y_0 \tag{11}$$

$$\delta = \sqrt{\Sigma(X'-X)^2 + \Sigma(Y'-Y)^2}/n \tag{12}$$

(2) Additional Image Measuring Processing by the Additional Image Measuring section 105 (step S140)

Figure 9:
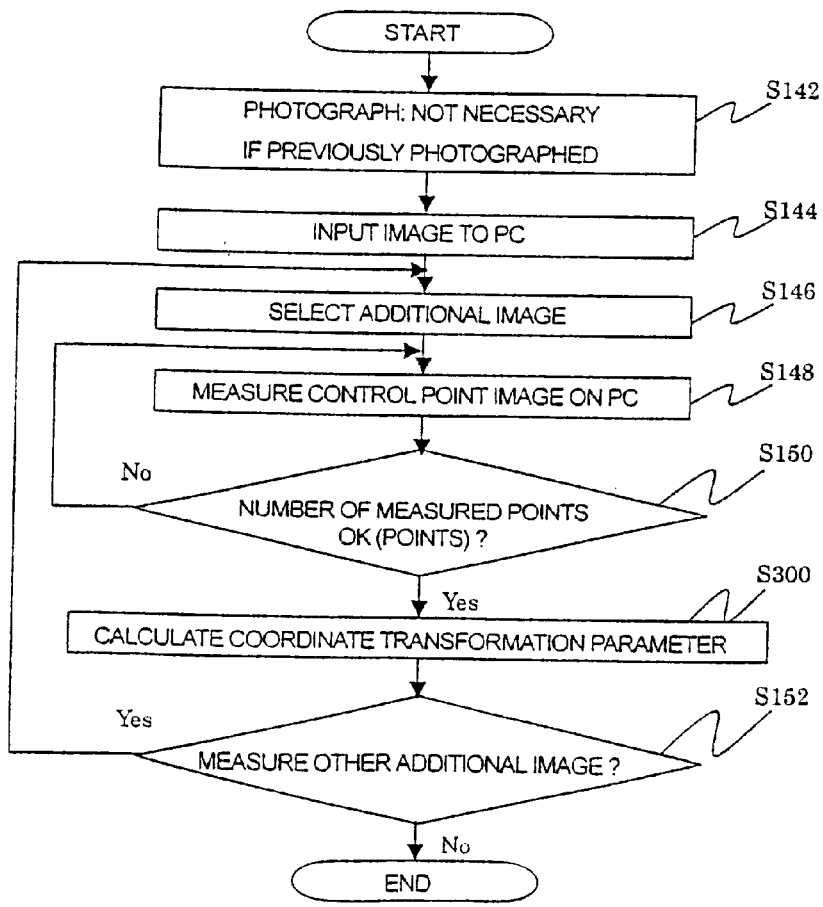
FIG. 9 is a flow chart of additional image measuring.

Next, additional image measuring processing (step S140) will be described in detail. FIG. 9 is a flow chart of additional measuring. If the number of images to be photographed is one, alternatively if an image is formed with one image temporarily, this processing can be skipped. Also, if a plurality of images are photographed first in steps S114 and S116, a step of photographing (step S142) and a step of inputting an image to a PC (step S144) can be skipped.

Photographing of additional images is performed so as to include all the control points set by the control point setting (step S112) carried out in the control point measuring processing (step S110). Then, the images are inputted to a PC (step S144), the additionally photographed images are displayed on the display section 5, and an additional image to be measured is selected (step S146). Then, the control points imprinted on the selected image are measured on a PC (step S148). This work is repeated by a number of times equal to the number of control points (step S150). For example, if a portable computer of a pen input type is used, by indicating the control points as targets by a pointing device such as a pen, the image coordinates (px, py) (or the photographic coordinates (x, y)) thereof is obtained. Then, coordinate transformation parameter calculation like that described above is performed (step S300).

Further, for additionally measuring other images, the process returns to the additional image section (step S146), and this processing is repeated by a number of times equal to the number of images to be photographed. When no additional measuring is carried out, the process moves to next step to form an ortho-image (step S160).

(3) Ortho-image Formation Processing by the Ortho-image Forming Section 103 (step S160)

Figure 10:
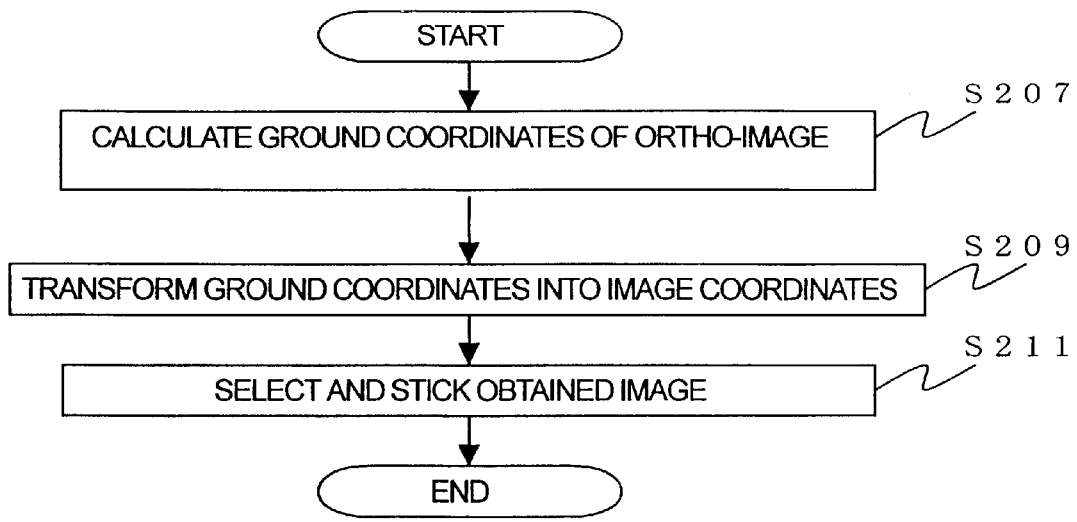
FIG. 10 is a flow chart of an ortho-image forming process.

Next, ortho-image formation processing (step S160) will be described in detail. FIG. 10 is a flow chart of an image forming processing.

First, a ground coordinate for each pixel on an ortho-image is calculated (step S207). In this processing, for forming an ortho-image, the image coordinates (x, y) for the ortho-image are transformed into. the ground coordinates (X, Y, Z). The ground coordinates (X, Y, Z) is calculated by using the transformation parameters previously obtained in the step S205 of the coordinate transformation parameter calculation processing (step S300). In other words, the ground coordinates (X, Y, Z) corresponding to the image coordinates (x, y) for the ortho-image is provided by the following expression. Accordingly, a position for obtaining each pixel on the ortho-image can be obtained.

$X = X_0 + x\Delta X$ $Y = Y_0 - Y\Delta Y$ $$Z = -\frac{aX + bY + d}{c} \quad (13)$$

Herein, ($X_0$, $Y_0$): Position of left upper side of ortho-image in ground coordinate system, ($\Delta X$, $\Delta Y$): Size of one pixel in ground coordinate system (e.g., m/pixel), (x, y): Image coordinates for ortho-image (X, Y, Z): Ground coordinates, a, b, c, d: Coefficients of plane equation formed by a plurality of control points interpolating certain image coordinates (x, y).

This time, by using the transformation parameters obtained in step S205, the image coordinates (x, y) corresponding to the ground coordinates (X, Y, Z) obtained in step S207 is calculated based on the expressions 2 and 3 or the expressions 5 and 6 (step S209). From the obtained image coordinates (x, y), a gray value on the ground coordinates (X, Y, Z) for the proper image is obtained. This gray value is a pixel gray level in a two-dimensional position (X, Y) on the ortho-image. In this way, a gray value of an image to be stuck to a position (X, Y) on the ground coordinates is obtained. By performing the foregoing processing for all the pixels of the ortho-image, image sticking is carried out (step S211).

Hereinbelow, sticking of a plurality of images is described more.

If the number of images is not singular but plural, then selection of an image is decided based on a positional relationship between the control points and the camera. In other words, a position ($X_0$, $Y_0$, $Z_0$) of a camera for each image is calculated based on the expressions 2 and 3. Accordingly, a distance is obtained from values thereof and actually measured values (X, Y, Z) of control point coordinates, a pixel gray value of a closer image is obtained and then the image is stuck. Thus, by carrying out image sticking by using an image closer to the control point, image data having high resolution can be selected.

(4) Ortho-image Correction Processing by the Ortho-image Correcting Section 104 (step S180)

Figure 11:
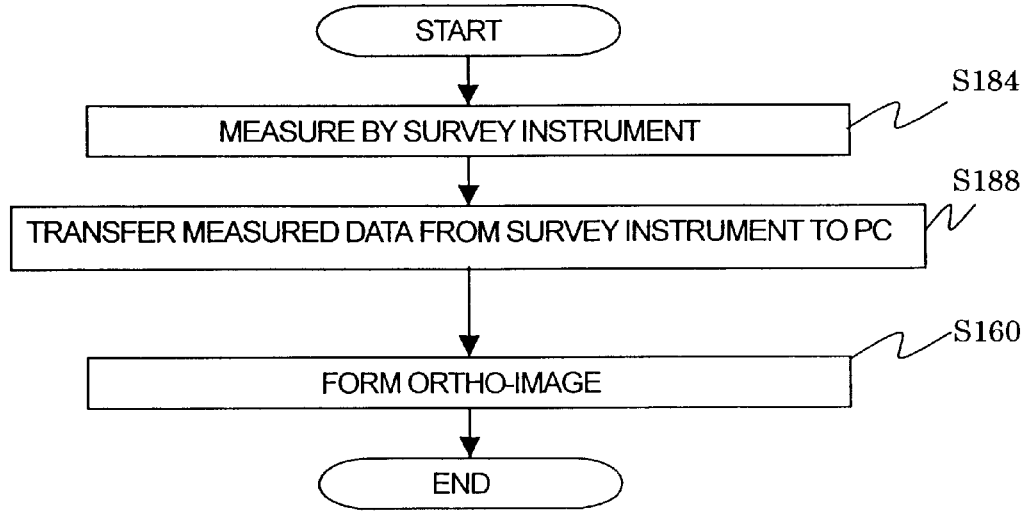
FIG. 11 is a flow chart of ortho-image correction process.

Next, ortho-image correction (step S180) will be described in detail. FIG. 11 is a flow chart of ortho-image correction.

Ortho-image formation (step S160) is performed, checking is made on the formed ortho-image visually or by later described processing. If there are measuring mistaken parts or parts which especially need measuring data, measuring is performed for these parts the survey instrument (step S184). The three-dimensional coordinates (ground coordinates) measured is transferred from the survey instrument to the control unit 10 (step S188), the above-described ortho-image formation (step S160) is automatically executed, immediate displaying of the ortho-image is carried out by the display section 5, and then checking is made again.

Accordingly, since measuring is performed point by point and processing is performed while confirming a corrected image in real time, measuring mistakes or measuring omissions can be prevented, and thus measuring can be always performed while confirming an image as an end product.

Next, a flow illustrating a method of extracting and correcting a control point shortage place or an improper place from the formed ortho-image will be described.

Figure 12:
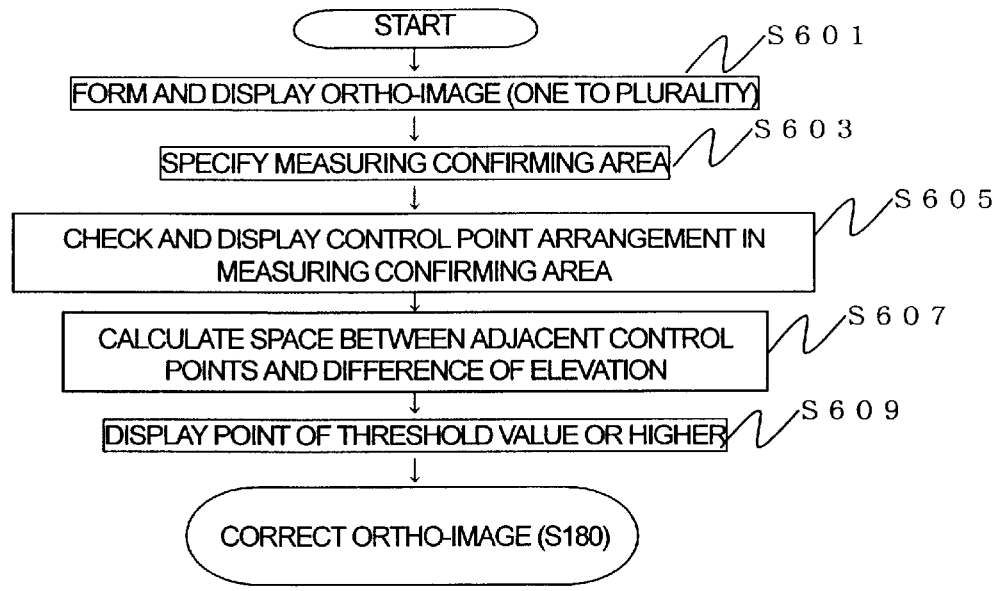
FIG. 12 is a flow chart of displaying a control point shortage area or an improper image area.
Figure 13:
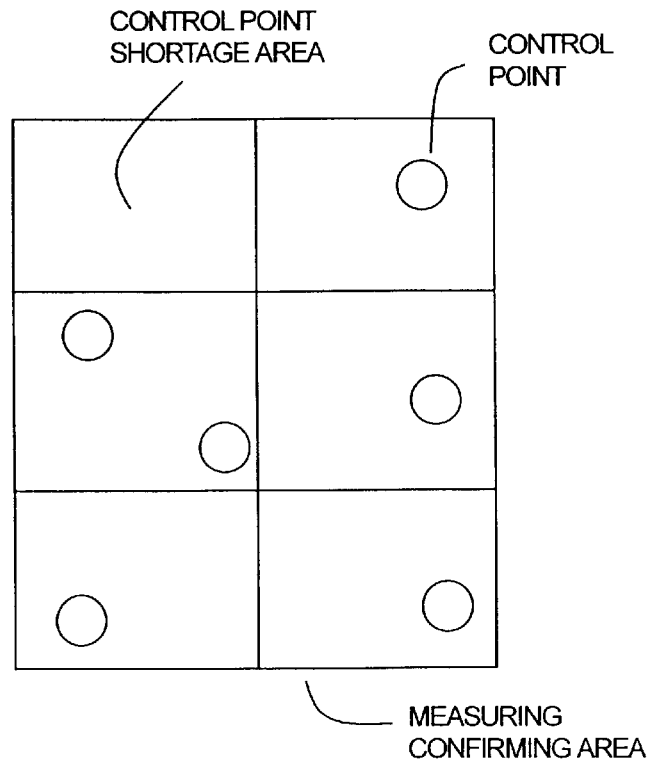
FIG. 13 is an explanatory view showing an example of a control point shortage area or an improper image area.

FIG. 12 shows a flow chart of control point shortage place or improper image place displaying. FIG. 13 is an explanatory view showing an example of a control point shortage area or an improper image area.

First, control point shortage place displaying is executed. The ortho-image formed from one or a plurality of images is first displayed (step S601). Then, a range in a measuring area which is intended to be confirmed is specified (step S603). Here, whether control points are located in a proper control points arranging area or not is checked, and displayed (step S605). For example, if the number of control points is six, a display is like that shown in FIG. 13. For checking control point arrangement, a proper control point range is divided on the ortho-image based on the number of control points to be measured, the coordinates of the control points are checked, decision is made as to whether the control points are located in the divided sections or not, and a result of the decision is displayed. Alternatively, a frame of a proper control point range like that shown in FIG. 13 (in this example, the area is divided into six sections) is displayed. But no limitation is placed on a method for deciding a proper control point range.

Subsequently, displaying of an improper image place is executed. First, a gap and a difference of elevation between adjacent control points are calculated (step S607). Here, a point of which a calculated value (e.g., a difference of elevation) is equal to or higher than a threshold value is displayed so as to show the fact (step S609). The threshold value is calculated from an image reduction scale such that a drastically changed point can be detected from, for example, the number of control points or a gap and a difference of elevation between the control points.

Then, as described above, in ortho-image correction (step S180), a control point shortage part and a part in the vicinity of the point of which the calculation value is equal to or higher than the threshold value are measured by the survey instrument, and then the image is corrected. If no satisfactory result is obtained even by these procedures, it is advisable to execute additional image measuring based on the information regarding these displayed images.

By the above measuring and processing, the control point shortage part or the improper part of the ortho-image can be corrected.

Next, a method for extracting the shortage part or the improper part from the formed ortho-image and displaying the same will be described. Hereinbelow, a method of specifying a shortage/improper part based on image resolution will be described.

Figure 14:
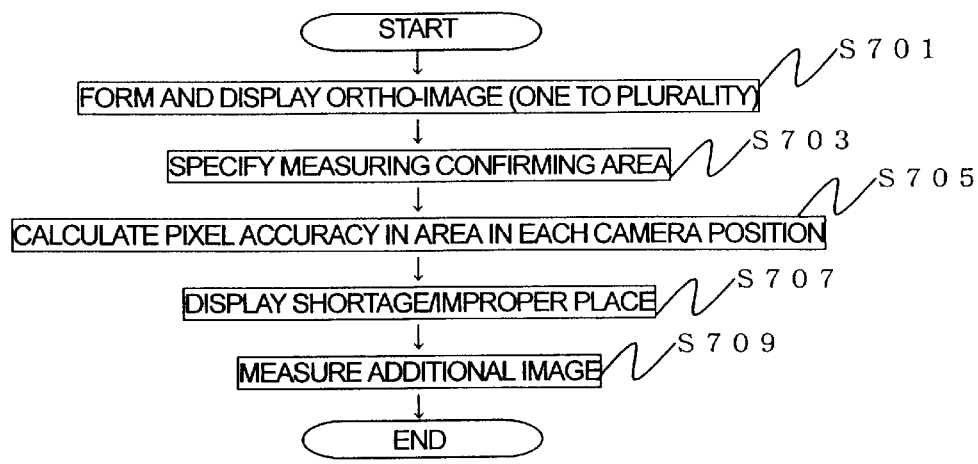
FIG. 14 is a flow chart of displaying an image shortage place or an improper place.
Figure 15:
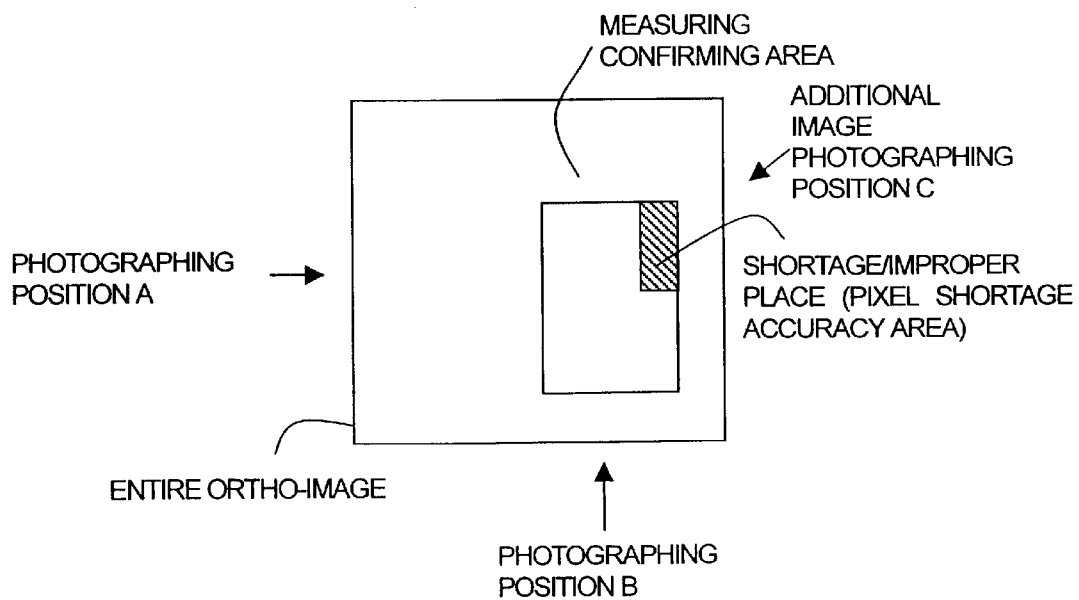
FIG. 15 is an explanatory view showing displaying of an image shortage place or an improper place.

FIG. 14 shows a flow chart of displaying an image shortage part/improper part. FIG. 15 is an explanatory view showing displaying of an image shortage part/improper part. Necessary measuring accuracy is set according to an object as it differs from object to object.

First, the ortho-image formed from one or a plurality of images is displayed (step S701). Here, cases of performing photographing from positions A and B are assumed. Then, a range in a measuring area which is intended to be confirmed is specified (step S703). Since a camera position ($X_0, Y_0, Z_0$) has been obtained based on the expressions 2 and 3, accuracy of one pixel in the measuring confirming area is calculated from this position (step S705). If photographing is performed from plural directions, the above calculation is executed for each camera. Then, a place where pixel accuracy of each camera does not achieve set accuracy and a range for overlapping are displayed on the ortho-image (step S707). Then, additional image measuring is performed from the direction of the displayed place (step S709). Herein, a case of photographing additional images from an additional image photographing position C is described.

Accordingly, an image for compensating for the image resolution (one pixel accuracy) of the image shortage place/improper place is obtained and, as a result, a satisfactory image can be obtained. The pixel accuracy can be determined, for example, in a manner that accuracy is reduced as a ratio of transforming a centrally projected image into an ortho-image is increased, or as a distance from an image photographing point to an object having an imprinted image is increased.

(5) Orientation

Next, orientation of each model will be described in detail. The orientation is, for example, a part of processing in step S1500 shown in FIG. 4.

Based on the three-dimensional coordinates of each image obtained in step S1400 shown in FIG. 4, orientation can be sequentially performed from the measuring points (e.g., six or more measuring points) such as the control points/orienting points imprinted in each model image. The orientation is data used for checking in step S1700.

First, as an example, relative orientation is described. For stereo images, positions of left and right cameras are respectively obtained by calculation shown below.

Figure 16:
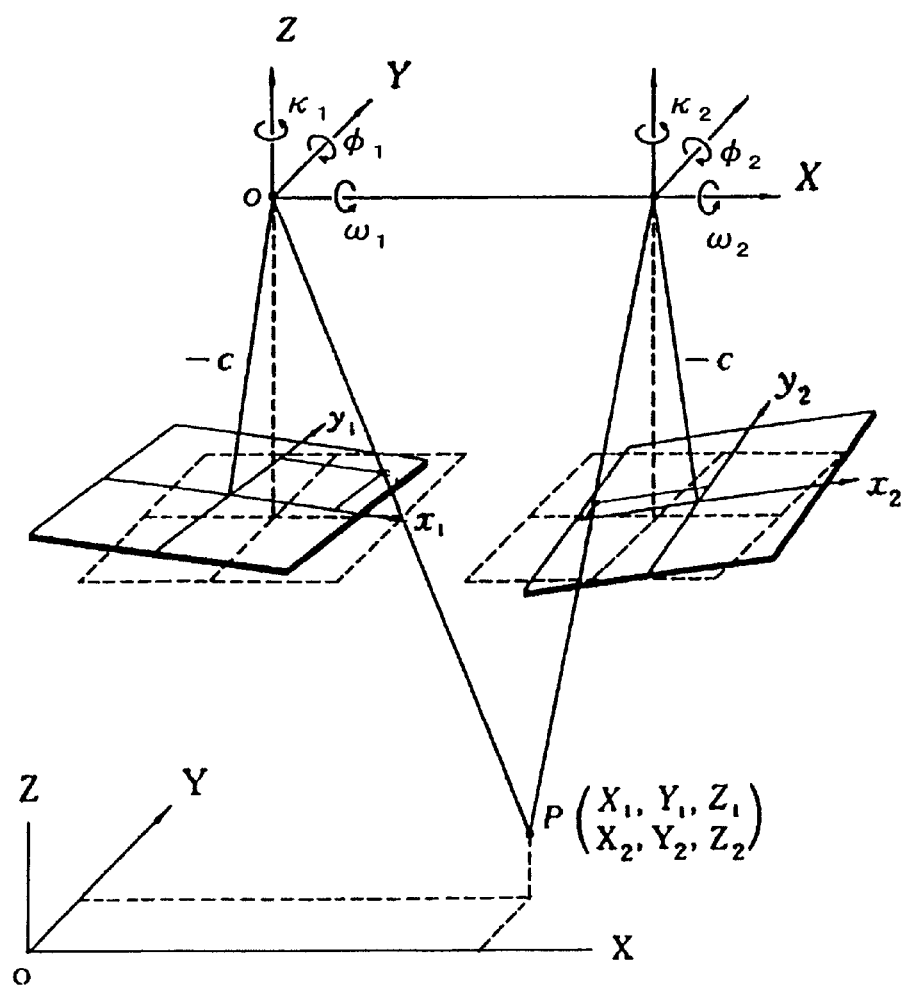
FIG. 16 is an explanatory view showing the camera coordinates and the model coordinates.

FIG. 16 is an explanatory view showing the camera coordinates and the model coordinates.

In the camera coordinate system, a lens center (projection center, principal center) is set as an original point, and x and y axes are in parallel with x and y axes of the photographic coordinates. If a principal distance is c (c>0), then a point on a photographic plane is expressed by (x, y, −c). The model coordinate system (X, Y, Z) is a three-dimensional coordinate system for defining a stereo image formed from a pair of two stereo photographs, and an original point thereof is set in the projection center of the left photograph.

First, parameters are calculated under a coplanarity condition expression like the following.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \tag{14}$$

Herein, $X_{01}, Y_{01}, Z_{01}$: Projection center coordinates of left image expressed by model coordinate system, $X_{02}, Y_{02}, Z_{02}$: Projection center coordinates of right image expressed by model coordinate system, $X_1, Y_1, Z_1$: Image coordinates of left image expressed by model coordinate system, $X_2, Y_2, Z_2$: Image coordinates of right image expressed by model coordinate system.

Now, as shown in the drawing, an original point of the model coordinate system is set in the projection center of the left side, and a line connecting the projection center of the right side is set in the X axis. For a scale, a base line length is set to a unit length. Parameters obtained at this time are five rotational angles, i.e., a rotational angle $\kappa_1$ of the Z axis and a rotational angle $\phi_1$ of the Y axis of the left camera, and a rotational angle $\kappa_2$ of the Z axis, a rotational angle $\phi_2$ of the Y axis and a rotational angle $\omega_2$ of the X axis of the right camera. In this case, it is not necessary to consider a rotational angle $\omega_1$ of the X axis of the left camera as it is zero.

Under the above condition, a coplanarity condition expression 15 becomes one like that shown below, and each parameter can be obtained by calculating this expression.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \tag{15}$$

Herein, between the model coordinates (X, Y, Z) and the camera coordinates (x, y, z), a relational expression of coordinate transformation like that shown below is established.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \tag{16}$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

By using the foregoing expressions, unknown parameters are obtained based on the following procedure.

1. An initial approximate value is usually set to 0.
2. A value of differential coefficient is obtained by the expression 7 when the coplanarity condition expression (expression 13) is tailor-developed around the approximate value and made linearization, and then an observation equation is established.
3. By using the least squares method, a correction amount is obtained for the approximate value.
4. The approximate value is corrected.
5. By using the corrected approximate value, operations from 2 to 5 are repeated until results converge.

No convergence may occur, for example, as in the case where arrangement of the control points, orienting points is improper. In such a case, in the displaying of orientation results in step S1600 of FIG. 4, an improper image is discriminated, and then displayed.

If the results of calculating unknown parameters converge, another step, for example, successive orienting, is performed. The successive orientation is for setting an identical coordinate system by unifying inclinations or reduction scales of the respective models subjected to orientation and inter-connecting a plurality of images. In the successive orientation, a pair of stereophotographs are connected to each other by fixing one orientation parameter and operating only the other orientation parameter. If this processing is carried out, a connection range represented by the following expression is calculated.

$$\Delta X_j = (X_{jr} - X_{jl})/(Z_0 - Z_{jl})$$

$$\Delta Y_j = (Y_{jr} - Y_{jl})/(Z_0 - Z_{jl})$$

$$\Delta Z_j = (Z_{jr} - Z_{jl})/(Z_0 - Z_{jl})$$

$$\Delta D_j = \sqrt{(\Delta X_j^2 + \Delta Y_j^2)} \qquad (17)$$

Herein, ($\Delta X_{j1} \Delta_{j1} Y \Delta Z_{j1}$): j-th left model of course coordinate system ($\Delta X_{jr}, \Delta Y_{jr}, \Delta Z_{jr}$): j-th right model of course coordinate system If $\Delta Z_j$ and $\Delta D_j$ are equal to a predetermined value (e.g., 0.0005 (1/2000)) or lower as a result of calculation, it is decided that the successive orientation is normally executed.

If results of calculation do not converge, or if normal execution of the successive orientation is not decided, then an error is outputted in the orientation result display in the step S1600 of FIG. 4, and a failure, such as an improper image or the like, is discriminably displayed.

C. Application (1) Use of Various Survey Instruments

Next, use of various survey instruments and advantages will be described.

For example, if correction work is carried out by the non-prism total station, in the case of an object which returns a light (measuring signal), an ortho-images is renewed as occasion demands only by performing measuring for the object. Accordingly, use of such a survey instruments is extremely effective for facilitating work and providing capability of measuring a number of points.

Use of another survey instruments is very effective in that if correction processing is carried out by an auto-tracking total station, only by walking with a prism in a shortage measuring area, an ortho-image can be formed with higher accuracy.

Use of the other survey instruments is also greatly effective in that if an area can receive date from satellites, only by walking with a GPS in the area, an ortho-image is renewed, and any operator can form an ortho-image while easily performing complementary measuring.

For obtaining a high-density and highly accurate ortho-image without any failures, it is advisable to perform stereo photographing to overlap ranges to be measured, and perform relative orientation an actual place. In this way, automatic stereo matching (image correlation processing) is performed from stereo images to obtain high-density three-dimensional measuring points and, by forming an image by the ortho-image forming section, high-density and highly accurate ortho-image can be obtained. Alternatively, a shortage part, a discontinuous part or the like is manually measured on the display while seeing formed stereo images, and by combining the measuring points thereof and then forming an ortho-image by the ortho-image forming section, an ortho-image having high luminance can be obtained without any failure.

(2) Measuring of Wide-ranging Area

A wider range can be measured by executing, after the measuring for the measuring range 1 shown in FIG. 3 is over, the process again from START of the image formation shown in FIG. 2. In this case, no special consideration is necessary for a boundary between the ranges to be measured. Alternatively, by intentionally overlapping adjacent ranges, e.g., the measuring ranges 1 and 2 with each other, and placing some control points in the area thereof, control point measuring of these points by the survey instrument can be omitted, and it is only necessary to measure images of these points (step S148). Also, by increasing an overlapping rate, images can be stereo-measured by using the second embodiment of the present invention. Accordingly, by using the images and control points of the measuring ranges, 1, 2, ... so as to form an ortho-image in each area, an ortho-image unifying the measuring ranges 1, 2, ... can be easily formed. Thus, gradual expansion of area to be measured can be facilitated.

(3) Off-line measuring

Figure 17:
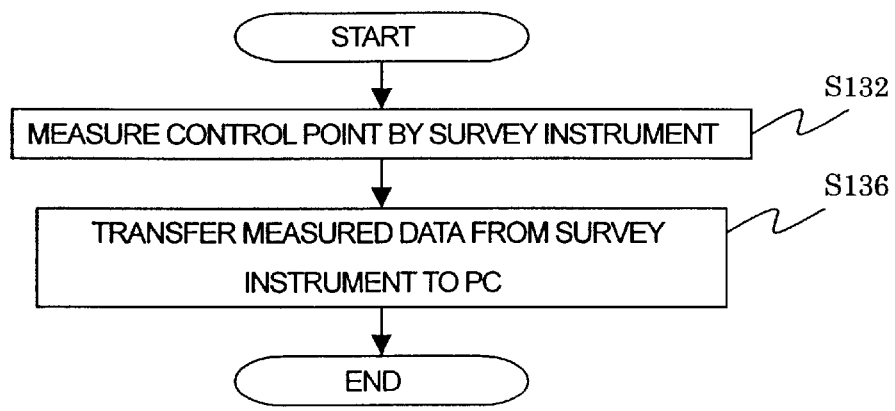
FIG. 17 is a flow chart of off-line processing.
Figure 18:
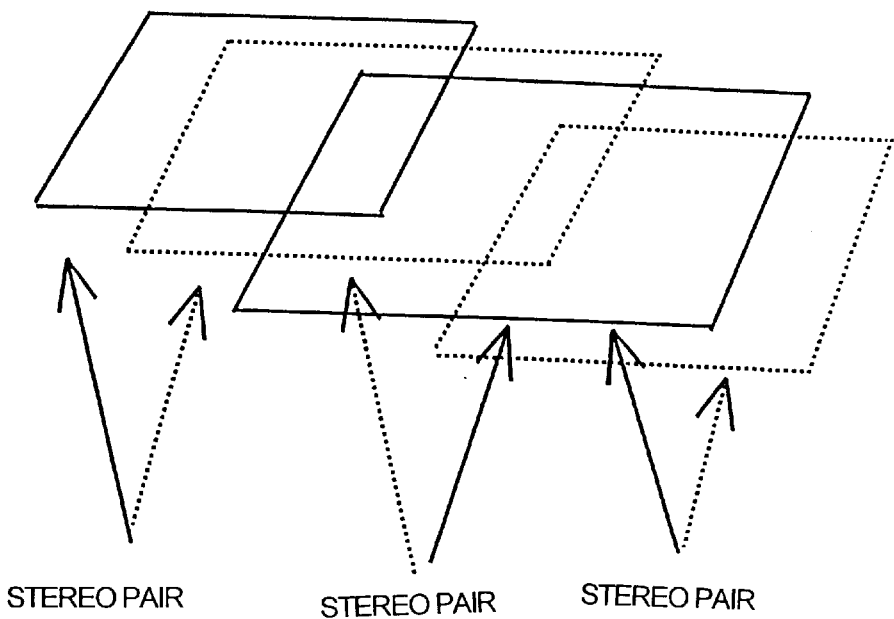
FIG. 18 is an explanatory view showing conventional image measuring and photographing.

The control point measuring (step S110) was an example for performing on-line measuring of control points. Next, off-line processing will be described. FIG. 17 shows a flow chart of off-line processing.

In the case of off-line processing, only photographing and control point measuring by the survey instrument are performed in an actual place, and all other operations are done off-line (e.g., in an office or the like). Off-line measuring in control point measuring (step S110) is divided into, for example, image photographing and control point measuring, and these operations are carried out separately in a job site. Results of these operations are then used for performing thorough analysis in the office or the like. In this case, a plurality of images are obtained beforehand, and image formation is performed later while selecting a proper image.

Accordingly, for the control point measuring, the survey instrument and a PC are not associated with each other (in other words, a PC is unnecessary), and measuring is carried out only with the survey instrument (step S132). Then, control point data obtained by the measuring are batch-transferred to a PC (step S136). Then, additional image measuring (step S140) is performed. Thus, in the case of off-line processing, since control point measuring and photographing are carried out separately, an image obtained by aerial photographing performed by a helicopter, a balloon or the like can be processed.

An image measuring program for executing the foregoing image measuring method of the present invention can be provided by a recording medium such as a CD-ROM, a floppy disk or the like.

What is claimed is:

1. An image forming apparatus comprising.
   a control point measuring section for measuring a centrally projected image having a plurality of control points, and obtaining the image coordinates for said control points;
   a coordinate transformation parameter calculating section for obtaining a transformation parameter for correlating, based on said image coordinates for said control points obtained by said control point measuring section and three-dimensional coordinates for actually measured control points, said image coordinates with said three-dimensional coordinates;
   an orthogonally projected image (ortho-image) forming section for forming an orthogonally projected image from said centrally projected image based on said transformation parameter obtained by said coordinate transformation parameter calculating section; and
   an ortho-image correcting section for correcting the image coordinates obtained by said ortho-image forming section based on the three-dimensional coordinates for actually measured additional points, and then performing correction of said orthogonally projected image.

2. An image forming apparatus according to claim 1, further comprising:
   an additional image measuring section for measuring another centrally projected image to include said control points measured by said control point measuring section, and calculating a coordinate transformation parameter for the measured another centrally projected image by using said coordinate transformation parameter calculating section.

3. An image forming apparatus according to claim 1, wherein said measured control points are measured by one of a global positioning system and a survey instrument as a three-dimensional coordinate input section for measuring a distance and an angle from an already-known point.

4. An image forming apparatus according to claim 1, wherein
   said control point measuring section automatically obtains each image coordinate value of a centrally projected image corresponding to each control point for which the three-dimensional coordinates are obtained.

5. An image forming apparatus according to claim 1, wherein
   said coordinate transformation parameter calculating section calculates, by satisfying a collinear condition for central projection and using an image input section in which a principal distance is known, a transformation parameter based on at least three control points for which ground coordinates are known.

6. An image forming apparatus according to claim 1, wherein said coordinate transformation parameter calculating section corrects lens distortion based on one of lens distortion data of the image input section and actually measured data regarding the plurality of control points.

7. An image forming apparatus according to claim 1, wherein said ortho-image forming section selects, for forming an orthogonally projected image by sticking a plurality of images, each obtained image based on a distance from each image to one of a control point and a measuring point.

8. An image forming apparatus according to claim 1, wherein said ortho-image correcting section forms, where a plurality of centrally projected images are obtained, an orthogonally projected image by doing one of the following: combining, on priority basis, images of places having reduction scales equal to or lower than a predetermined reduction scale; combining, on priority basis, images close to one of a measuring position and a control point.

9. An image forming apparatus according to claim 1, wherein
   said ortho-image correcting section displays, where said plurality of centrally projected images are obtained, an shortage place or an improper place of image, which results from formation of the orthogonally projected image by said ortho-image forming section.

10. An image forming apparatus according to claim 1, wherein
    for measuring a wide-ranging area, by using parts of control points located in first and second measuring ranges in common, an orthogonally projected image is formed in each measuring range.

11. An image forming method comprising:
    an image input function, to which a plurality of images including control points or orienting points overlapped with one another are inputted;
    a storage function for previously storing ground coordinate values of control points or orienting points;
    an orthogonally projected image (ortho-image) forming function for forming an ortho-image from the plurality of images inputted by said image input function based on said ground coordinate values of the control points or the orienting points and one of image coordinate values and photographic coordinate values; and
    a determining function for determining, based on the ortho-image formed by said ortho-image forming function, necessity of re-photographing, and necessity of changing one of a photographing position, a control point position, and an orienting point position.

12. An image forming method according to claim 11, further comprising:
    a display function for displaying the ortho-image formed by said ortho-image forming function.

13. An image forming method according to claim 11, wherein
    said image input function includes a function of inputting stereo images as a plurality of images, and
    said determining function includes a function of extracting a non-overlapped area, the area being not overlapped by the stereo images in said ortho-image.

14. An image forming method according to claim 11, wherein
    said determining function includes a function of determining a shortage or a failed positioning, of control points or orienting points included in portions overlapped by stereo images in said ortho-image.

15. An image forming method according to claim 11, wherein
    said determining function includes a function of extracting a non-photographed area in a measuring target area, which is not covered with images in said ortho-image.

16. An image forming method according to claim 11, wherein said ortho-image forming function includes a function of discriminatably displaying on a display screen of said ortho-image one of a non-overlapped area, a non-photographed area, a shortage of the control points or the orienting points, and a failed positioning of the control points or the orienting points, determined by said determining function.

17. An image forming method according to claim 11, wherein said determining function further includes a correction data forming function of forming data for re-photographing, where one of the following is detected in said ortho-image: a non-overlapped area, a non-photographed area, a shortage of the control points or the orienting points, and a failed positioning of the control points or the orienting points.

18. An image forming method according to claim 11, wherein said ortho-image forming function includes a function of executing orientation based on a plurality of images, and said determining function includes a function of outputting, if results of said orientation do not converge, an instruction to change setting of the control points or the orienting points to said ortho-image forming function.

19. An image forming apparatus comprising:

means for achieving an image forming method according to claim 11.

20. A computer-readable storage medium having an image forming program for achieving an image forming method according to claim 11.

21. An image forming apparatus according to claim 1, wherein the ortho-image forming section automatically forms the ortho-image.

22. An image forming method according to claim 11, wherein the ortho-image forming function is automatic.

* * * * *